United States Patent Office 3,137,582
Patented June 16, 1964

3,137,582
PRESERVATION OF PLANT MATERIALS
Alina S. Szczesniak, Yonkers, N.Y., assignor to General Foods Corporation, White Plains, N.Y., a corporation of Delaware
No Drawing. Filed Apr. 25, 1962, Ser. No. 189,982
3 Claims. (Cl. 99—192)

The present invention relates to the preservation of plant materials, more particularly this invention is concerned with improving the textural qualities of plant materials which are preserved by freezing.

To date, no method has been devised for preserving the turgidity or crisp textural qualities of edible or non-edible plant materials which are subjected to either a conventional slow freezing operation or the more refined rapid freezing methods which use a volatile liquid refrigerant which freezes the moisture content of the plant in a matter of seconds. It has been recognized to improve the thawing characteristics of certain plant materials by reducing the mechanical injury to the cell walls due to large ice crystal formation by the use of a calcium salt solution such as calcium chloride. However, the firming effect of the calcium ion appears to be only partially effective and has been found useful only in the case of certain types of plant materials. One of the reasons for the partial ineffectiveness of a calcium dip in the case of a freeze-thawed product is the fact that a calcium dip minimizes degradation by strengthening the cellular walls. However, a calcium dip will not have any effect on minimizing the chemical injury produced by a high electrolyte concentration during freezing nor will it prevent the formation of large ice crystals during freezing. It would be advantageous therefore to combine a freezing operation with a preliminary treatment which would prevent the formation of large ice crystals while also lowering the concentration of detrimental electrolytes which are formed in equilibrium with the ice formation during freezing.

It is an object of this invention to preserve the turgor or crisp-like texture of a fresh plant material which is subjected to freezing by preliminary treatment of the product to be frozen with a solution which will prevent chemical as well as physical injury to the plant during the freezing operation.

The present invention is founded on the discovery that treatment of plant material with dialkyl sulfoxide solution having a concentration of above 30% so as to replace at least part of the moisture in the plant material with the treating solution will result in an improved freeze-thawed product from the standpoint of textural crispness and freshness of appearance. The frozen product upon thawing from the frozen state will experience a substantially undamaged cellular structure which will approach all of the qualities appearancewise of a fresh plant material.

Edible and non-edible plant materials may be frozen and preserved according to this method after preliminary treatment with the dialkyl sulfoxide solution. Among the typical edible materials which could be preserved according to this method are lettuce, tomato, citrus fruits, and green vegetables. Typical among the non-edible plant materials are flowers such as orchids and other decorative plants of the non-flowering type. Essentially, this process may be applied to any fresh plant product containing moisture and which moisture is capable of being replaced, at least in part, by a solution of dialkyl sulfoxide. The degree of penetration of the dialkyl sulfoxide will determine the degree of turgidity or freshness that will be achieved on thawing the product from a frozen state.

While various dialkyl sulfoxide compounds or homologues may be used having alkyl groups ranging from 1–6 carbons, it is a preferred feature of this invention to use dimethyl sulfoxide. Dimethyl sulfoxide is a clear, water-white, very hygroscope liquid having substantially no odor and a slightly bitter taste. It has a melting point of 18.5° C., a boiling point of 189° C., and a specific gravity of 1.1 at 20° C. The compound is substantially non-toxic and produces no adverse effects upon food materials which have been treated by dipping in a dimethyl sulfoxide solution for 1 to 2 hours.

The dialkyl sulfoxide solution may be applied to the edible or non-edible plant material by dipping, soaking, spraying or any other technique which assures a sufficient penetration of the treating solution into the product. A soak or dip is preferable in the case where a high degree of penetration is desired. The period of treatment should be sufficient to permit at least some dialysis of plant moisture from the plant into the sulfoxide solution since the preservative effect appears dependent to some extent on reducing the moisture content of the plant prior to freezing.

The freezing operation is carried out at a temperature below 32° F. and may be either a rapid freeze, that is, by immersion or direct contact of the treated plant material with a liquid refrigerant having a boiling point of −320° in the case of liquid nitrogen to −70° F. to −10° F. in case of the liquid "Freons," such as dichlorodifluoromethane (Freon 12) and octafluorocyclobutane (Freon 318); or a slow freeze at a temperature of −30° F. to +30° F. such as that typically performed in a blast freezer, plate freezer, and the like. Regardless of the freezing operation, it is believed that the beneficial effects of the sulfoxide treatment will be evident in the prevention of the formation of large ice crystals as well as inhibiting the formation of excessively high electrolyte concentrations in equilibrium with the ice formed during freezing.

The degree of penetration of the dialkyl sulfoxide solution will vary with the period of direct contact involved. Beneficial results will be apparent upon thawing a frozen product that has been immersed in a dialkyl sulfoxide solution for only 1 minute. However, to achieve a degree of turgidity, or freshness equivalent to a fresh plant product a soaking time of 30 to 120 minutes is usually required. In the case of tomatoes, for example, a soak of 90 minutes will achieve a degree of freshness, appearancewise, indistinguishable from the fresh product while lettuce will require about 120 minutes to achieve a similar degree of freshness.

The period of time for the preliminary treatment with the sulfoxide solution may be shortened considerably when the product is rapidly frozen by an immersion dip in a liquid refrigerant, such as liquid nitrogen which boils at −320° F. at atmospheric pressure, liquid nitrous oxide which boils at −127° F., and the liquid Freons which boil at −70 to −10° F. In the case of a rapid freeze the degree of sulfoxide treatment need not be as drastic since the smaller ice crystal formation in a rapid freeze is not as damaging to the cellular tissue as in the case of the larger ice crystal formation of a slow freeze. However, the sulfoxide treatment is useful in a rapid freeze since it will permit the frozen product to be stored at the more higher refrigeration temperatures which are conventionally used without the danger of growing large ice crystals which will damage the cellular tissue. This storage problem has been a major drawback of the more rapid freezing methods, such as immersion freezing.

The sulfoxide treatment may also be shortened by combining the sulfoxide treatment with a firming treatment, such as a calcium salt firming treatment. Typically this would involve a dual soak, once in a calcium solution, and once in a sulfoxide solution prior to freezing, and such freezing could be a rapid freeze.

This invention will now be more fully described by reference to the following specific examples.

Example I

Fresh tomatoes were sliced lengthwise into small sections and were soaked in a solution of dimethyl sulfoxide having a concentration of 80% for 90 minutes. The slices were removed from the treating solution, drained, and frozen in a plate freezer having a temperature of 20° F. for 1 hour. The frozen product was refrigerated for 6 weeks and then thawed at room temperature. The thawed tomato slices had a firmness, color, and outward appearance similar to fresh tomato slices.

Example II

Fresh leaves of lettuce were soaked in a solution of dimethyl sulfoxide having a concentration of 85% for 2 hours, removed from the treating solution, drained and frozen in a plate freezer having a temperature of 10° F. for 2 hours. The frozen product was refrigerated for several weeks, and then thawed. The thawed product had a firmness, color and outward appearance similar in all respects to fresh lettuce leaves.

While this invention has been described by reference to the above specific examples, it is recognized that the procedure disclosed is applicable to all other forms of fresh plant materials which may be subjected to a freezing operation. The disclosed preliminary treatment with a solution of dialkyl sulfoxide is applicable to any plant material wherein the moisture thereof may be replaced in whole or in part by dialkyl sulfoxide.

This application is a continuation-in-part of co-pending application Serial No. 15,825, filed March 18, 1960, now abandoned.

What is claimed is:

1. The method of preserving the turgor and crisp texture of frozen fresh plant materials upon thawing which comprises directly contacting a solution of dialkyl sulfoxide at a concentration of above 30% wherein the alkyl groups contain from 1 to 6 carbons with a plant material for at least one minute to replace at least part of the moisture in said plant with said dialkyl sulfoxide, and then freezing said material at a temperature below 32° F.

2. The method of claim 1 wherein the dialkyl sulfoxide solution is directly contacted with the plant material by a soaking operation.

3. The method of claim 2 wherein the freezing operation is performed by a rapid freezing method wherein the plant is frozen by direct contact with a volatile liquid refrigerant.

References Cited in the file of this patent
UNITED STATES PATENTS

| | | |
|---|---|---|
| 2,536,176 | Harris | Jan. 2, 1951 |
| 2,581,050 | Smedslund | Jan. 1, 1952 |
| 2,698,804 | Crisafulli et al. | Jan. 4, 1955 |
| 2,738,280 | Makower et al. | Mar. 13, 1956 |
| 2,785,076 | Felton | Mar. 12, 1957 |
| 2,818,388 | Sullivan et al. | Dec. 31, 1957 |